Sept. 21, 1937.   P. B. RENFREW   2,093,849
LIQUID DISPENSING APPARATUS
Filed April 6, 1933
FIG. 1.
FIG. 2.
FIG. 3.
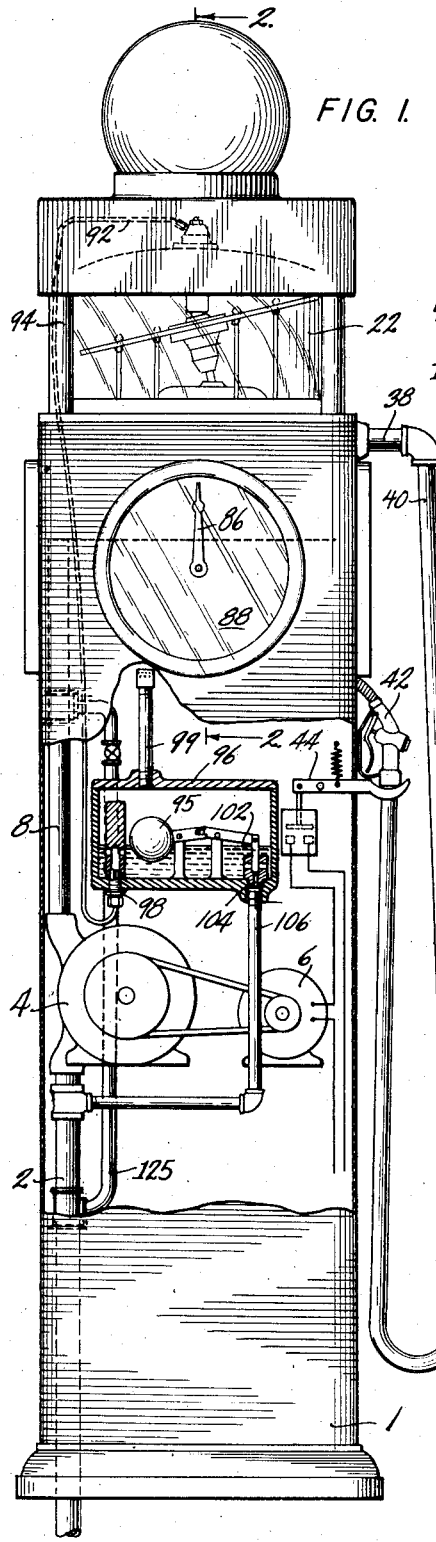
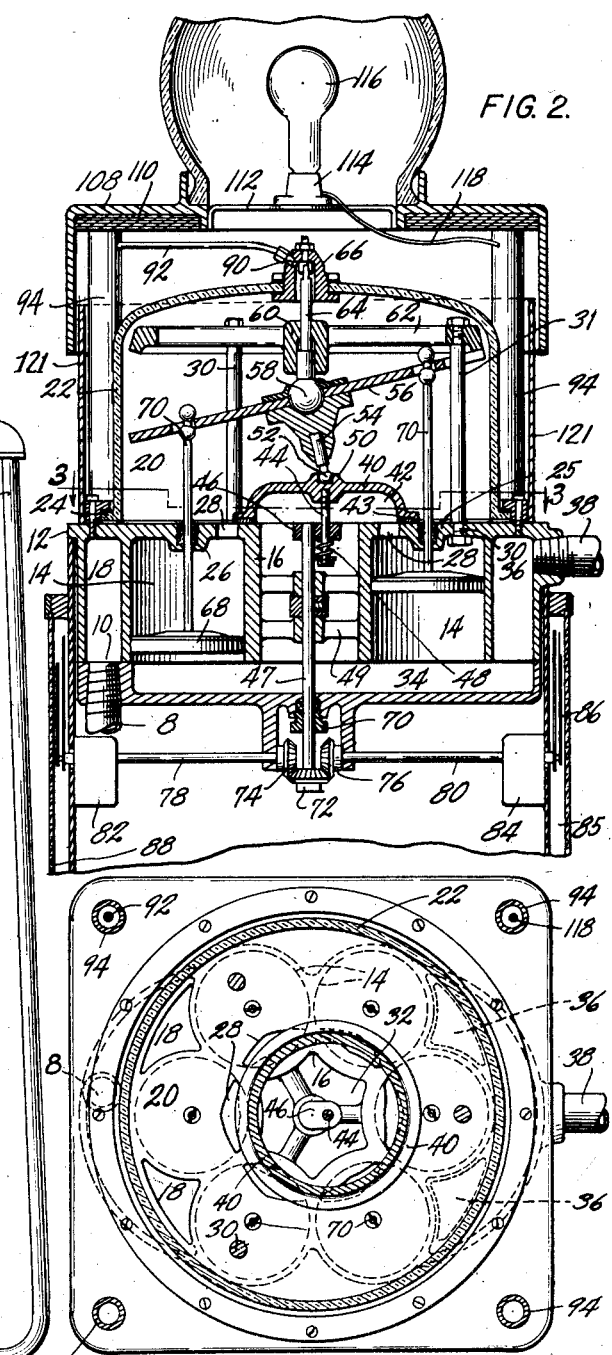
INVENTOR:
PAUL B. RENFREW
BY:- Cox & Moore
ATTYS.

Patented Sept. 21, 1937

2,093,849

UNITED STATES PATENT OFFICE 2,093,849

LIQUID DISPENSING APPARATUS

Paul B. Renfrew, Fort Wayne, Ind., assignor to S. F. Bowser & Company, Incorporated, Fort Wayne, Ind., a corporation of Indiana Application April 6, 1933, Serial No. 664,713

6 Claims. (Cl. 73—200)

My invention relates to liquid measuring devices of general application.

The device is specifically shown in connection with an apparatus for dispensing gasoline.

Among the objects of my invention are to provide a compactly arranged liquid dispensing device which combines a meter, an air separator and a sight glass. Another object of my invention resides in the provision of a new meter of the displacement type especially well adapted for the dispensation of gasoline and other fuels wherein there is combined all of the advantages of the meter type of device with the visible chamber type of device, and wherein the meter not only functions as a meter, but also functions as a visible mechanism chamber, as an air separator and as a sight glass. Among the other objects of my invention is to provide a liquid dispensing apparatus wherein the meter itself functions as an air separator; to provide a liquid dispensing device wherein the meter is disposed in inverted arrangement with the register portion thereof lowermost, and with the inlet chamber of the meter disposed above the displacement cylinders and provided with associated instrumentalities functioning as an air separator for the dispensing apparatus.

In addition, I provide the meter with associated instrumentalities for not only discharging the air separated from the liquid or gasoline and discharging it to a desired point, but also I include, in association with the meter, a liquid recovery line for discharging liquid passing through the air discharge back to the system in advance of the meter. This may include the discharge of this liquid either back to the liquid reservoir or back to the suction side of the pump, in which latter association I provide means for preventing air having access to the suction side of the pump.

In addition to the foregoing I also provide a new type of meter.

These and other objects of my invention will be apparent from a perusal of the following specification when taken in connection with the following drawing wherein Fig. 1 is a perspective view of a dispensing device wherein the liquid dispensing line is provided with a combined meter, sight gauge and air release;

Fig. 2 is a section taken substantially along the line 2—2 of Fig. 1, and

Fig. 3 is a section substantially along the line 3—3 of Fig. 2.

Referring now to the drawing, it will be seen that the liquid dispensing means, which may be of any desired type, comprises the housing 1 enclosing the liquid dispensing line 2, coming from a suitable source of liquid supply, such as gasoline, and this includes a pump 4 driven by a motor 6. This pump obviously is provided with the usual by-pass, well known in the art, but which is not shown for purposes of convenience and illustration.

The discharge from the pump is connected with the pipe 8 which extends upwardly within the enclosing housing and terminates as at 10. This pipe is adapted to discharge into the meter. The meter comprises a lower casting which includes the displacement cylinders, the passages from the inlet pipe 10 to the displacement cylinder and passages from the displacement cylinders to the discharge pipe from the meter.

In addition, the meter includes an upper housing and a transparent portion, or alternately, a housing which is wholly transparent, which housing surrounds and encloses the driving mechanism between the displacement pistons and the valve-operating mechanism controlling the passage of liquid to and from the cylinders.

In the present instance, I have illustrated one embodiment or arrangement of my invention, but it is understood that any type of displacement meter may be utilized and adapted for the purpose.

In the present instance I have shown the basal portion of the meter as involving a casting 12 in which is disposed a concentric series of displacement cylinders 14 disposed about a central circular wall 16 hereinafter referred to. In addition, the casting includes one or more inlet and outlet passages herein particularly shown as inlet passages, or passages 18, preferably disposed between the outer casting 12 and the walls of adjacently disposed cylinders. Two of these inlet passages 18 are shown. They communicate with the inlet pipe 10 on one hand and on the other hand discharge into the space 20 enclosed by the bowl 22 of the meter. This bowl 22 is of general dome-shaped design and may be formed either circular, square, or any shape desired. In the present instance I have shown the bowl 22 as formed circular and provided with a flange 24 which is adapted to be secured by means of bolts in air-tight and leak-proof fashion to the upper horizontal wall of the basal casting 12. The upper horizontal wall 25 of the basal casting is provided with a plurality of openings. One opening 26 for each piston rod, one opening 28 forming communication between the bowl space 20 and each cylinder. In addition, certain of the cylinders are provided with openings 30 through which bolts may pass for securing a head, hereinafter mentioned, in a rigid position. In addition, the central portion of the upper wall of the basal plate 24 is provided with a relatively large opening 32, and this opening communicates with the central passageway formed concentrically within the series of cylinders 14 and formed by the circular inner wall 16 hereinafter referred to.

This passageway extends downwardly and communicates with a passageway 34 which, in turn, communicates with the bottom of each one of the cylinders 14. In addition, this passageway communicates with one or more passages 36 formed in a manner corresponding to the formation of the passages 18. These passages 36 communicate with the pipe 38 which is the discharge pipe from the meter.

The valve means for governing the flow to and from the cylinders comprises a preferably circular valve 40 of the general cross-sectional shape shown in the drawing. This valve is substantially dome-shaped and is provided with an interior hollow dome 42. The dished, or flanged portion of the valve, is substantially circular and is provided with any desired type of sealing means 43. This sealing flange is of desired formation to slidingly traverse the openings 28 in a manner well known in meter construction. In other words, in certain positions the flange portion of the valve will overlie certain other ports 28 thereby closing communication between the liquid-containing space 20 of the dome or bowl 22, and a respective cylinder 14, while in other position the valve will form communication between this cylinder and the interior portion of the dome-shaped portion of the valve, which, in turn, communicates with the space 34, in turn communicating with the discharge port 36 and the discharge pipe 38. Means is provided for holding the valve resiliently on its seat while at the same time permitting proper movement of the valve to traverse the valve base for the cylinders.

In the illustrated embodiment, this comprises a shaft 44 extending down through the passageway within wall 16 having a crank arm 46 in turn rigidly connected to an axially disposed shaft 47 having bearings in the spider arms 49 from the wall 16, and a spring 48 is located between this crank 46 and the headed nut of the shaft 44, whereby effectively to hold the valve on its seat. Obviously any other desired resilient construction may be utilized for accomplishing this purpose. In addition the valve is provided on its upper outer face with a ball seat 50 in which fits the ball 52 on the end of a projection 54 on the bottom portion of the wobble plate 56. This wobble plate is well known in the art and is mounted on a stationary ball 58 on a stem 64 extending through a preferably cup-shaped head 60 mounted in a web-shaped plate 62 held from rotation by the bolts 31 hereinbefore referred to. The web-shaped plate 62 is stationarily mounted with respect to the cylinder block by means of the bolts 31, and the ball 58 may be adjusted vertically in order to adjust the altitude of the point about which the wabble plate is mounted for tilting movement. This adjustment is accomplished by the stem 64 of the ball 58 being threaded in the head 60, which is stationarily secured on the web plate 62, the end of the shaft 64 extending into a fitting 66 carrying a turning element and fitted into a central aperture formed in the glass bowl 22, sufficient sealing means being provided to prevent the escape of air or liquid. By turning the rod 64 in the threaded head 60 I may accomplish vertical adjustment of the ball 58 to vary the stroke of the pistons which reciprocate in the cylinders. These pistons 68 reciprocate in the respective cylinders and are mounted on the ends of piston rods 70 which, in turn, are pivotally carried by the wobble plate 56, whereby when the liquid under pressure is forced through pipe 10 into the inlet passages 18 and thence into the bowl passage 20, if the inlet passage to a cylinder be open, the pressure of the liquid will force the piston down, filling the cylinder with liquid. As soon as the valve covers this port, the liquid flow will be cut off, and the piston, having been reciprocated in its cylinder, will force liquid back out of the port 28, thence into the interior 42 of the valve, the valve having now communicated the port 28 with the passage within wall 16. The liquid will then be forced out of the cylinder through the passage within wall 16 and passages 34 and 36 and through the discharge pipe 38. It will be understood, that by reason of the operation of the pistons, the wobble plate 56 will be actuated to permit the reciprocation of each piston in turn, and in addition, this wobble plate, by means of its connection with the valve, will gyrate the valve to suitably connect the cylinder ports 28 first with the bowl passage or chamber 20 and then with the discharge passage within wall 16. Gyratory movement of the valve is indicated by means of the crank 44—46 with the central shaft 47, which is thus given a continuous rotary movement. This shaft passes through a suitable stuffing box 70 and the bottom of the shaft is provided with a gear 72 in turn meshing with two gears 74 and 76 on oppositely extending shafts 78 and 80 which, in turn, connect with mechanism 82 and 84, the construction of which is well known in the art, for operating the rotatable hands 86 on opposite faces of the dials 88, which are observable from the exterior opposite faces of the housing.

By permitting the incoming liquid or other gasoline to be dispensed to come into the inverted upper bowl 22 of the meter, preliminary to passing into the displacement cylinders, I am enabled to utilize this upper portion of the meter as an air and liquid separator chamber whereby the air will flow to the top where it can pass through an outlet for discharge to a desired point. In the present instant I have provided a fitting 66 with a restricted outlet 90 at its top, and which communicates by means of a pipe 92, which in turn passes down through a hollow post 94 hereinafter referred to. This pipe 92 passes down through this hollow pipe, thence through the interior of the housing, where it discharges into the bottom of the housing 96 through a suitable fitting 98. The air and liquid flowing through this pipe 92 discharge into the housing 96, the air passing outwardly through the upper portion of the housing through means of a conduit 99, which, in turn, is provided at its top with a suitable discharge through to the atmosphere within the housing. The liquid discharging into the housing 96 collects therein and actuates a ball float 95 pivotally mounted therein so as to control a valve 102 in turn opening and closing a liquid recovery line passageway 104 which connects by means of a pipe 106 discharging into the suction side of the pump.

It is understood that the pipe from the liquid reservoir to the suction side of the pump is always provided with the usual foot valve. In this type of connection there will be no necessity for a float-controlled return to the suction side of the pump for the liquid, such as shown within the chamber 96.

In order to prevent the top of the transparent bowl from becoming heated by the sun's rays I provide the basal casting 12 with connections for a plurality of posts enclosing the transparent bowl 22. These posts 94 extend upwardly and carry at their upper portion a crown 108 which carries preferably heat insulating material 110. This crown is arranged to extend down along the sides a desired distance so as to mask the pipe 92, while permitting a free view of the transparent bowl 22. This crown 108 is provided with a central opening in which is located a spider 112 which forms a central mounting for an electrical fitting 114 in which is mounted an electric lamp 116. The wires 118 for the lamp extend downwardly through the casing and pass down through one of the posts 94 for connection down through the housing or through a suitable opening in the basal plate with suitable electrical connections for operating the lamp, which connections are well known in the art. The opening between the spider 112 permits ample illumination of the transparent meter bowl or dome 22.

The discharge pipe 38 from the meter extends outwardly of the housing and is provided with an L-shaped connection to a flexible hose 40 terminating in the usual valve-controlled nozzle 42, which is adapted, as is well known in the art, to not only control the flow of liquid through the nozzle, but also to operate the shiftable hook 44 pivotally mounted in the housing, and controlling the motor for the pump circuit by means of the usual switch.

It will thus be seen that I have provided a novel arrangement of housing, pump, meter, air and liquid separator and sight glass for a liquid or gasoline dispensing device. It will thus be seen that by providing the meter with the chamber space in advance of the displacement cylinder and providing that chamber with a transparent portion and arranging the chamber above the displacement cylinder so that the liquid must flow into the chamber first before going to the displacement cylinder, and permitting the air and the liquid to pass upwardly and discharging the air to atmosphere, I have efficiently separated the air before the liquid can go to the meter. In this way, I have provided a compact and novel arrangement, thereby utilizing not only the meter as a liquid measuring device, but also by forming a portion of the meter with a transparent portion and by providing the suitable instrumentalities, I am able to utilize this meter as an air separator and as a sight-glass. In this way I have eliminated the extra air separator which has heretofore been mounted in the lower part of the housing between the pump and the meter, and I have also eliminated the necessity for an extra sight glass or visi-gauge, which has heretofore been mounted on the outside of the housing between the meter and the flexible hose. In addition, by arranging the meter as hereinbefore described, I am enabled to accomplish two functions, to-wit: I utilize the mechanical means of the meter when in operation as a means for informing the purchaser that liquid is flowing, and I am also enabled to utilize the transparent bowl of the meter as a reservoir into which the transparent liquid, such as gasoline flows, thereby securing all of the advantageous features of a transparent dispensing bowl mounted at the top of the housing whereby the purchaser can actually see the liquid being dispensed, which has a most beneficial effect upon a purchaser, but he can also see the moving parts of the meter and knows that the liquid is flowing and is being dispensed.

It will also be seen that by disposing the liquid-containing bowl 22 above the cylinders, and which bowl is in the liquid flow-line from the pump 4, when the valve of the nozzle 42 is closed, the bowl 22 will remain filled with liquid. This is due to the fact that the conduit, extending downwardly from the pipe 10 to the liquid reservoir contains a one-way check valve, or foot valve, which yieldingly opens when the pump is in operation to permit the flow of liquid upwardly through the pipe, but which prevents the flow of liquid in the reverse direction. This construction, or any equivalent construction for retaining the bowl full of liquid at the termination of the dispensing operation, provides a liquid seal between the openings 28 of the cylinders and the continuously open air passageway 90 whereby to prevent the passage of air to the cylinders.

In addition, I may provide a second air-enclosing cylinder 121 spaced from the walls 22 and surrounding them to accord with certain fire regulations, which require a protecting means so that if stones or other objects are thrown at the pump, they will not come directly into contact with the walls 22, but will be protected by outer enclosing means. Instead of an outer second glass cylinder, a wire mesh can be used.

If desired, in certain localities where fire regulations require it, the pipe 8 may be provided with the valve-controlled drain disposed within the housing, and returning to the reservoir as shown at 125 so that the liquid in the bowl 22 may be drained to the reservoir during protracted periods when the pump is not to be used.

Having thus described my invention, what I claim as new and desire to obtain by Letters Patent of the United States is:

1. A liquid displacement meter comprising a casing having means forming a plurality of displacement cylinders and a bowl forming a combined housing and liquid reservoir disposed above said cylinders, a piston in each cylinder, a meter inlet adapted for connection to a source of liquid under pressure and connected directly to said reservoir, valve mechanism governing the flow of liquid from said bowl to said cylinders, including a wobble plate disposed in said bowl and connected to each piston, said bowl having an apertured head disposed substantially centrally in its top, an adjustment for said wobble plate passing through said head to permit the adjustment of said plate from the exterior of said bowl, said head having means forming a constantly open but restricted air outlet for said bowl.

2. A liquid displacement meter comprising a casing having means forming a plurality of displacement cylinders and a bowl forming a combined housing and liquid reservoir disposed above said cylinders, a piston in each cylinder, a meter inlet adapted for connection to a source of liquid under pressure and connected directly to said reservoir, valve mechanism governing the flow of liquid from said bowl to said cylinders including adjustable means disposed within said bowl and connected to each piston, said bowl having an apertured head substantially centrally in its top, adjusting means extending through said head and operatively connected with said adjustable means to permit adjustment thereof from outside of said bowl, and means forming a constantly open but restricted air outlet for said bowl.

3. A liquid displacement meter comprising a casing having means forming a plurality of displacement cylinders and a bowl forming a combined housing and liquid reservoir disposed above said cylinders, a piston in each cylinder, a meter inlet adapted for connection to a source of liquid under pressure and connected directly to said reservoir, valve mechanism governing the flow of liquid from said bowl to said cylinders including adjustable means disposed within said bowl and connected to each piston, said bowl having an apertured head substantially centrally in its top, adjusting means extending through said head and operatively connected with said adjustable means to permit adjustment thereof from outside of said bowl, and means forming a constantly open but restricted air outlet for said bowl whereby air contained in the liquid in said bowl may be separated and exhausted to atmosphere before the liquid enters the measuring cylinders, and means connecting with said outlet for returning any liquid which may escape with the separated air back to the inlet side of the meter.

4. A liquid displacement meter comprising a casing having means forming a plurality of displacement cylinders and a bowl forming a combined housing and liquid reservoir disposed above said cylinders, a piston in each cylinder, a meter inlet adapted for connection to a source of liquid under pressure and connected directly to said reservoir, valve mechanism governing the flow of liquid from said bowl to said cylinders including adjustable means disposed within said bowl and connected to each piston, said bowl having an apertured head substantially centrally in its top, adjusting means extending through said head and operatively connected with said adjustable means to permit adjustment thereof from outside of said bowl, and means forming a constantly open but restricted air outlet for said bowl, a separating chamber, conduit means connecting said air outlet with the separating chamber whereby to deliver in said chamber any air and liquid escaping through said air outlet, said chamber having a vent to permit the separated air to escape to atmosphere, and liquid return conduit means for returning liquid from the separating chamber to the inlet side of the meter.

5. A liquid displacement meter comprising a casing having means forming a plurality of displacement cylinders and a bowl forming a combined housing and liquid reservoir disposed above said cylinders, a piston in each cylinder, a meter inlet adapted for connection to a source of liquid under pressure and connected directly to said reservoir, valve mechanism governing the flow of liquid from said bowl to said cylinders including adjustable means disposed within said bowl and connected to each piston, said bowl having an apertured head substantially centrally in its top, adjusting means extending through said head and operatively connected with said adjustable means to permit adjustment thereof from outside of said bowl, and means forming a constantly open but restricted air outlet for said bowl, a separating chamber, conduit means connecting said air outlet with the separating chamber whereby to deliver in said chamber any air and liquid escaping through said air outlet, said chamber having a vent to permit the separated air to escape to atmosphere, and liquid return conduit means for returning liquid from the separating chamber to the inlet side of the meter, and a float valve for said return conduit means, said float valve being normally closed but opening when the liquid level in said separating chamber rises to a predetermined height therein.

6. A liquid displacement meter comprising a casing having means forming a plurality of displacement cylinders and a bowl forming a combined housing and liquid reservoir disposed above said cylinders, a piston in each cylinder, a meter inlet adapted for connection to a source of liquid under pressure and connected directly to said reservoir, valve mechanism governing the flow of liquid from said bowl to said cylinders including adjustable means disposed within said bowl and connected to each piston, said bowl having an apertured head substantially centrally in its top, adjusting means extending through said head and operatively connected with said adjustable means to permit adjustment thereof from outside of said bowl, and means forming a constantly open but restricted air outlet for said bowl, said bowl being transparent throughout and an annular screen mounted on said meter and extending in position to enclose and protect the bowl from injury.

PAUL B. RENFREW.